United States Patent
Jerance et al.

(10) Patent No.: US 8,519,700 B2
(45) Date of Patent: Aug. 27, 2013

(54) MAGNETIC ANGULAR POSITION SENSOR INCLUDING AN ISOTROPIC MAGNET

(75) Inventors: Nikola Jerance, Besancon (FR); Didier Frachon, Besancon (FR)

(73) Assignee: MMT SA, Zug (CH)

( * ) Notice: Subject to any disclaimer, the term of this patent is extended or adjusted under 35 U.S.C. 154(b) by 711 days.

(21) Appl. No.: 12/093,705

(22) PCT Filed: Nov. 15, 2006
(Under 37 CFR 1.47)

(86) PCT No.: PCT/FR2006/002526
§ 371 (c)(1),
(2), (4) Date: Mar. 6, 2009

(87) PCT Pub. No.: WO2007/057563
PCT Pub. Date: May 24, 2007

(65) Prior Publication Data
US 2011/0175600 A1  Jul. 21, 2011

(30) Foreign Application Priority Data

Nov. 15, 2005 (FR) ................... 05 11567
Apr. 3, 2006 (FR) ................... 06 51174

(51) Int. Cl.
*G01B 7/30* (2006.01)
(52) U.S. Cl.
USPC ............ 324/207.25; 324/207.12; 324/207.2
(58) Field of Classification Search
USPC .............. 324/207.25, 207.2, 207.21, 174
See application file for complete search history.

(56) References Cited

U.S. PATENT DOCUMENTS

| 4,150,653 | A * | 4/1979 | Grancoin ................. 123/617 |
| 6,326,781 | B1 | 12/2001 | Kunde et al. |
| 7,042,211 | B2 * | 5/2006 | Kabashima et al. ...... 324/207.25 |
| 7,288,931 | B2 * | 10/2007 | Granig et al. ............... 324/202 |
| 7,560,919 | B2 * | 7/2009 | Hatanaka et al. ......... 324/207.25 |
| 2004/0164733 | A1 * | 8/2004 | Fukaya et al. ............ 324/207.25 |
| 2005/0253578 | A1 | 11/2005 | Kawashima et al. |
| 2006/0158180 | A1 * | 7/2006 | Sato .......................... 324/207.25 |
| 2010/0176803 | A1 * | 7/2010 | Ausserlechner ......... 324/207.25 |

FOREIGN PATENT DOCUMENTS

| DE | 195 43 562 A1 | 5/1996 |
| DE | 197 37 999 A1 | 3/1999 |
| EP | 1 014 039 A1 | 6/2000 |
| EP | 1 365 208 A1 | 11/2003 |
| EP | 1 571 424 A1 | 9/2005 |

OTHER PUBLICATIONS

U.S. Appl. No. 12/852,219, filed Aug. 6, 2010, Frachon, et al.
U.S. Appl. No. 12/281,207, filed Aug. 29, 2008, Jerance, et al.
U.S. Appl. No. 13/640,893, filed Oct. 12, 2012, Frachon, et al.

* cited by examiner

*Primary Examiner* — Jay Patidar
(74) *Attorney, Agent, or Firm* — Oblon, Spivak, McClelland, Maier & Neustadt, L.L.P.

(57) ABSTRACT

An angular position sensor includes a moving element consisting of at least one essentially cylindrical permanent magnet turning about it axis, at least two magnetosensitive elements and at least one processing circuit furnishing a signal dependent on the absolute position of the moving element The magnetosensitive elements are located essentially at the same point and in that they measure the tangential component of the magnetic field and the radial and/or axial component of the magnetic field for furnishing 2 sinusoidal signals that are essentially 90° out of phase.

20 Claims, 14 Drawing Sheets

MAGNETIC ANGULAR POSITION SENSOR INCLUDING AN ISOTROPIC MAGNET

CROSS-REFERENCE TO RELATED APPLICATIONS

This application is based upon and claims priority under 35 U.S.C. §371 from International Patent Application No. PCT/FR2006/002526, filed Nov. 15, 2006, and French Patent Application Nos. 0511567, filed Nov. 15, 2005 and 0651174, filed Apr. 3, 2006.

BACKGROUND OF THE INVENTION

Field of the Invention

The present invention relates to the field of magnetic rotary position sensors for angles of up to 360°, and more particularly to position sensors for measuring the angular position of a steering column for a motor vehicle, without this application being exclusive.

Sensors which detect the angle on the basis of a magnetic field have many advantages:
  no mechanical contact with the moving part, and therefore no wear,
  insensitivity to soiling,
  low production cost,
  long life span.

There is known in the prior art the patent EP1083406 which describes a rotary sensor, having a ring magnet and two magnetosensitive elements which measure the radial component of the field generated by the magnet and which leads to two square-wave sinusoidal signals which, after decoding, serve to detect the position over 360 degrees.

The disadvantage of this solution is the presence of two probes, which may give rise to a measurement error due to the incorrect placement of one probe relative to the other. In addition, the presence of two integrated circuits which are offset spatially by 90° increases the final cost of the sensor since the printed circuit surface area may be large and the number of connections is increased.

Also known in the prior art are probes which make it possible to measure the two components of the magnetic field in one plane (Hall-effect probe, for example MLX90316 from Melexis, or magnetoresistive probes).

Also known in the prior art is the U.S. Pat. No. 6,316,935 which describes a position sensor which can rotate through 360° and which uses a magnetoresistive probe in order to determine the angular position of a disc magnet which is magnetised essentially diametrically (see FIG. 1). In said patent, the magnetoresistive probe which is sensitive to the direction of the magnetic field generated by the magnet is placed below the magnet and essentially on its axis of rotation. The probe measures the components Bx and By of the magnetic field on the axis of rotation of the magnet (see FIG. 2). Such an arrangement of the magnet and of the probe limits the use of such a sensor. This is because, in the particular case of using a rotary sensor to measure the angular position of a system with a through-shaft, such as a steering column for example, such an arrangement of the magnet and of the probe is not possible due to the fact that the size of the steering column prevents it from being possible to position the magnetosensitive element on its axis of rotation.

SUMMARY OF THE INVENTION

The present invention proposes to solve the abovementioned problems by making it possible to use two components of the magnetic field (radial and tangential or axial and tangential) which are measured simultaneously at a single point (in physical terms, it is considered that the measurements are carried out at a single point if the distance between the measurement points of the two components of the magnetic field is less than 5 mm) outside the axis of rotation of a ring magnet or disc magnet which is diametrically magnetised, so as to ascertain its angular position even though this angle does not correspond to the angle of the magnetic field (note: the direction of the magnetic field is "aligned" with the angular position of the magnet only if the measurement is carried out on the axis of this same magnet). The solution described below thus makes it possible to reduce the cost of the sensor and to increase the reliability of the measurements while advantageously adapting it to different geometric configurations, in particular in the case of a device with a through-shaft.

If we consider any point in space around a ring or disc magnet which is diametrically magnetised, the radial component and the axial component of the magnetic field generated by this magnet are two sine curves which are in phase, whereas the tangential component is a sine curve which is 90° out of phase with respect to the two other components of the magnetic field (see FIG. 3). It is therefore possible to use a pair of components of the magnetic field which are 90° out of phase (tangential and radial or tangential and axial) to decode the angle of the magnet, using the following formula:

$$\alpha(t) = \arctan\left(\frac{V_{1max}}{V_{2max}} \frac{V_2(t)}{V_1(t)}\right)$$

where:
—angle of rotation
$V_1$—radial or axial component of the magnetic field
$V_{1max}$—amplitude of $V_1$
$V_2$—tangential component of the magnetic field
$V_{2max}$—amplitude of $V_2$ The decoding of the angular position of the magnet on the basis of these two components, the amplitudes of which are generally different, requires the standardisation of the two components used so as to be able to perform the arctangent calculation in order to deduce the angle therefrom. These decoding and standardisation functions are carried out either by a separate element (4) or directly by a probe (e.g.: MLX 90136) which integrates the measurement of the two components of the field, the decoding of the angle and the standardisation of the two components of the field.

The economic advantage is then that of using a single integrated circuit of the SMD (Surface Mount Device) type with a much smaller printed circuit surface area than when using two probes positioned 90° apart around the magnet.

In one preferred embodiment, the magnetosensitive elements consist of at least one pair of magnetosensitive sensors, the sensitivity axes of which are parallel, said sensors of one pair being magnetically coupled by a ferromagnetic yoke which is perpendicular to said sensitivity axes, said yoke being arranged in a plane perpendicular to the axis of rotation or in a plane parallel to a plane passing through the axis of rotation. By way of example, the magnetosensitive elements consist of a probe with an integrated flux concentrator MLX90136 produced by Melexis, which comprises four coplanar sensors (the sensitivity axes of which are therefore parallel). These four Hall elements are placed below the edges of a ferromagnetic disc constituting a yoke. They are spaced apart by 90°. The magnetic field bends in the vicinity of the ferromagnetic disc (which has a high relative permeability).

The magnetic field lines are perpendicular to the surface of the magnetic flux concentrator and they pass through the Hall elements, thus making it possible to measure the two magnetic field components in the plane of the probe. Furthermore, the magnetic field measured by the Hall elements is amplified because the field lines are concentrated in the vicinity of the ferromagnetic disc. The Hall elements on each axis (X and Y or X and Z) are connected to a signal processing circuit which delivers the voltage difference of the two Hall elements (which eliminates the axial component of the magnetic field), which is amplified and sampled by an analogue/digital converter. The digital signal processing circuit multiplies each component by a programmable gain (which makes it possible to obtain sine curves of substantially equal magnitude) and carries out the various compensations (with regard to offset, orthogonality, variation in the parameters of the probe relating to temperature) before performing the division and the arctangent calculation. The angle obtained is available at the output of the integrated circuit, for example in the form of a voltage proportional to this angle.

This invention will advantageously use ring magnets made of plastoferrite with diametrical anisotropy, which makes it possible to obtain very good performance for the lowest possible cost. Furthermore, the use of a magnet with anisotropy facilitates the magnetisation process. This is because the performance (linearity of the output signal) of the sensor is directly dependent on obtaining a good diametrical magnetisation. The use of isotropic magnets is also possible, but the magnetisation process for obtaining a "good" diametrical magnetisation of the magnet is more complex. This is because the magnetisation field necessary for diametrically magnetising a ring magnet is easily obtained with a simple coil which is passed through by a current, but a curvature of the field lines is produced due to the difference in magnetic permeability between air and the material to be magnetised, which curvature follows the following relationship concerning refraction at the boundary between two media:

$$\frac{\tan(\alpha_1)}{\tan(\alpha_2)} = \frac{\mu_{r1}}{\mu_{r2}}$$

This curvature translates into a magnetisation of the material which is not diametrical and therefore into a distortion of the two components measured, as shown in FIG. 10. These two signals are not two sine curves which are 90° out of phase, which during the decoding phase translates into a very considerable non-linearity as can be seen in this same FIG. 10 which shows the signal decoded on the basis of the two components of the magnetic field.

In the case of an isotropic material, in order to correct and compensate this curvature of the field lines inside the magnet which leads to a "poor" diametrical magnetisation, the external shape of the magnet, instead of being circular, will advantageously be selected to be of an essentially elliptical shape (see FIG. 11).

It is also possible when using the probe MLX 90316 to program this probe in such a way as to partially compensate the non-linearity error. The compensation takes place via a programming of different gains over the full course of the sensor. In the case of such programming, there is shown in FIG. 12:
the signal decoded by a non-linear transfer function;
the non-linearity of the decoded signal.

In the case of an isotropic magnet or a magnet with radial anisotropy, it is also possible to magnetise the magnet progressively with a radial magnetisation which follows a sinusoidal law at the periphery of the magnet. This manner of magnetisation makes it possible to avoid the error on the magnetisation direction due to the refraction of the magnetic field lines, which occurs in the case of a diametrical magnetisation.

In the case where the application requires a redundancy of the output signals, it is of course possible to envisage doubling the system by using a second measurement point which is offset angularly from the first with respect to the axis of rotation. Preferably, it will therefore be possible to have two similar housings which each integrate the measurement and decoding of two signals, one tangential and the other resulting from the combination of radial and axial components, with a specific gain adjustment, so as to deliver two independent angular position signals.

In the case of an application such as measuring the position of a steering column associated with a steering wheel which performs a rotation over several revolutions, it may prove necessary to measure a course greater than 360°. It is then possible to use the sensor according to the invention by associating it with a motion reducer so as to reduce the rotation over several revolutions to a rotation less than or equal to one revolution at the sensor.

BRIEF DESCRIPTION OF THE DRAWINGS

The invention will be better understood with reference to the various figures.

DETAILED DESCRIPTION OF THE INVENTION

Figure 1:
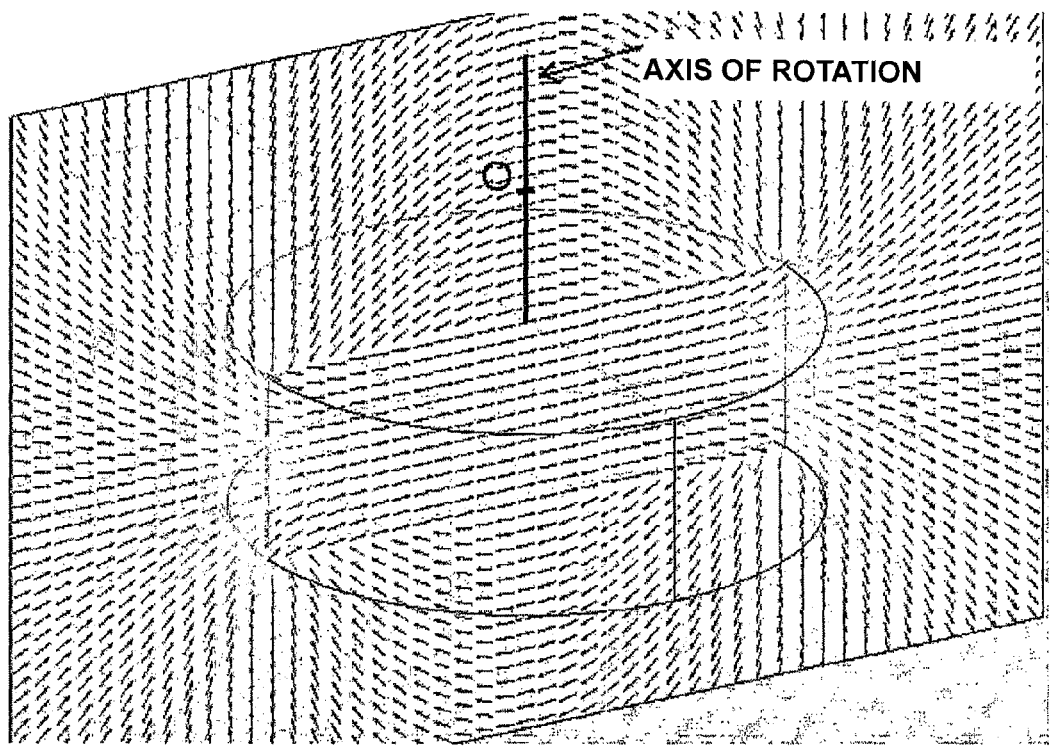
FIG. 1 shows the field lines generated by a diametrically magnetised disc magnet.
Figure 2:
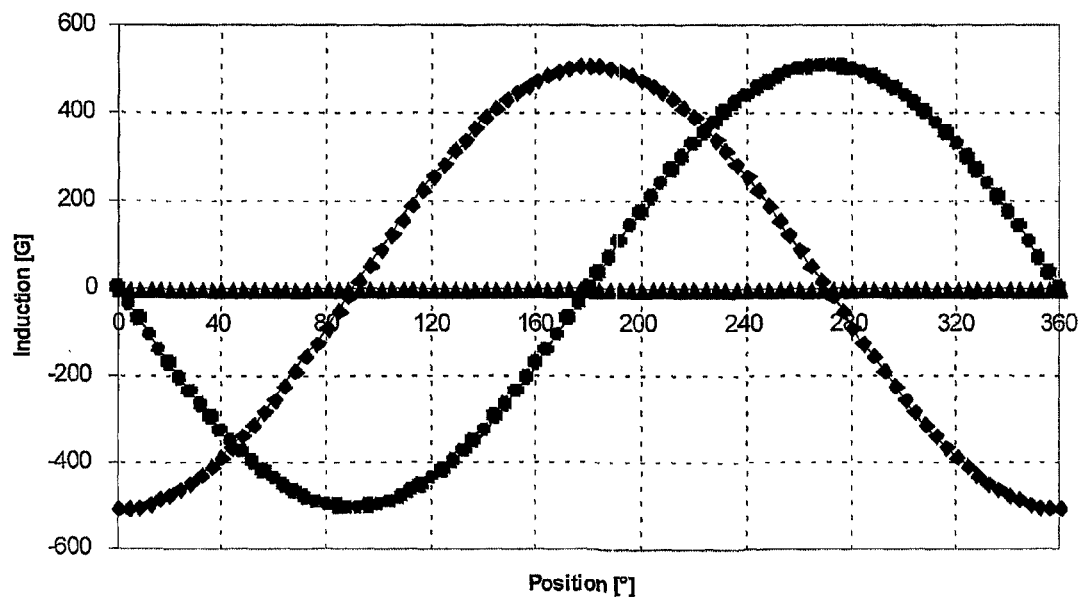
FIG. 2 shows the 3 magnetic induction components at a point located on the axis of rotation of the magnet—point O shown in FIG. 1.
Figure 3:
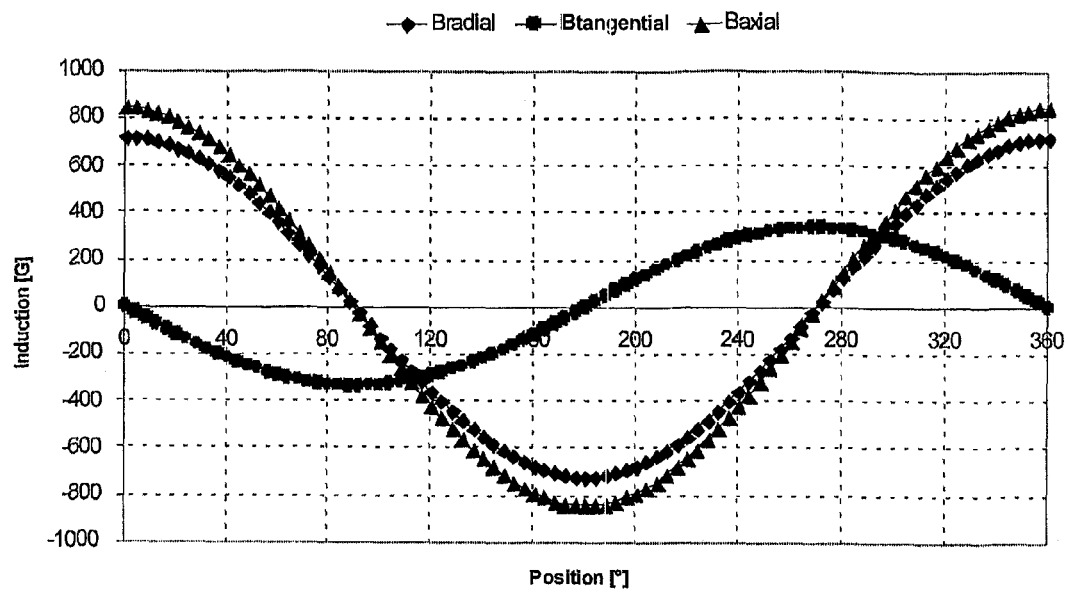
FIG. 3 shows the 3 magnetic induction components at a point located outside the axis of rotation of the magnet.

FIG. 1 shows the typical field lines obtained with a diametrically magnetised disc magnet. The field lines are shown on a plane passing through the centre of the magnet and co-linear with the magnetisation direction of the magnet. In FIG. 2 and FIG. 3, the radial (Bx), tangential (By) and axial (Baxial) components of the magnetic induction are shown respectively for a measurement point located on the axis of rotation of the magnet and at a point located on a radius larger than the outer radius of the magnet. FIG. 2 shows that the components X and Y of the magnetic induction on a point of the axis as a function of the rotation of the magnet are of equal amplitude, and that the axial component is zero regardless of the position above the magnet. With regard to FIG. 3, it can be seen that the 3 components of the magnetic induction are other than 0 and that the radial and axial components are in phase whereas the tangential component is 90° out of phase with respect to the two others.

Figure 4:
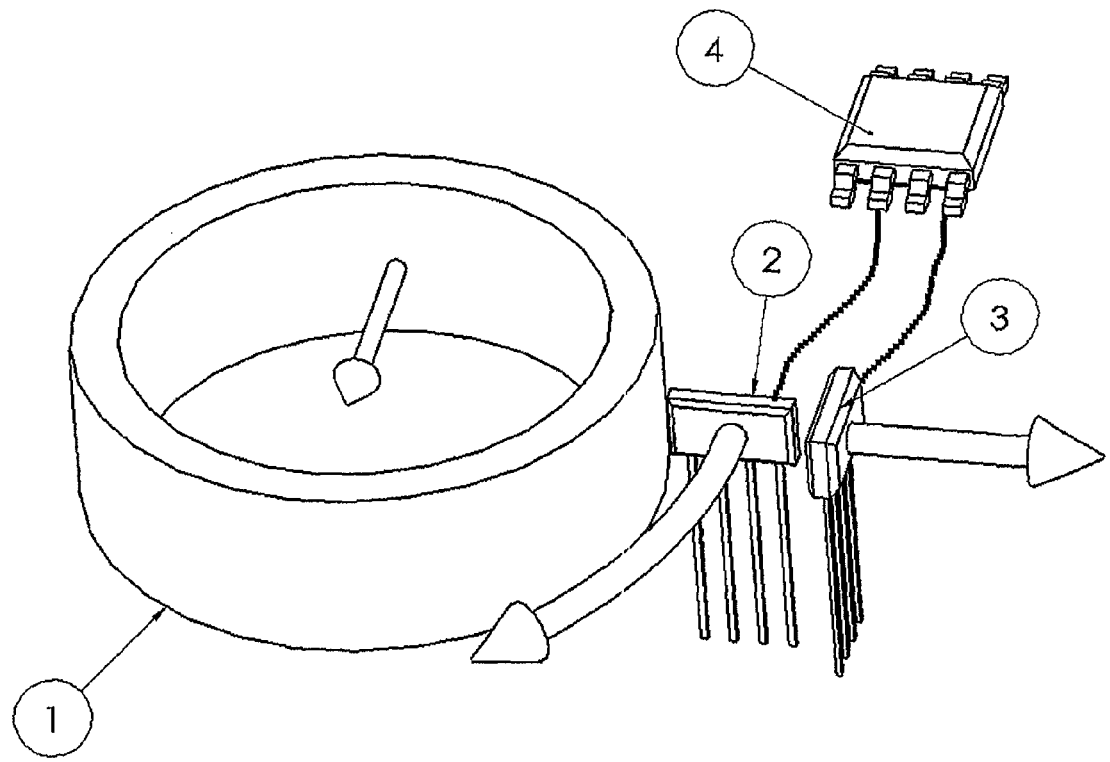
FIG. 4 shows a general view of the present invention.

FIG. 4 shows the sensor according to the present invention, which comprises an essentially radially magnetised ring-shaped permanent magnet (1); at any point in space, this magnet generates a magnetic field having radial or axial (3) and tangential (2) components which are measured by two magnetosensitive elements, the signals from which are then processed by a processing element (4) which carries out the decoding and also the standardisation of the two components in order to output an electrical signal which is proportional to the angular position of the magnet.

Figure 5:
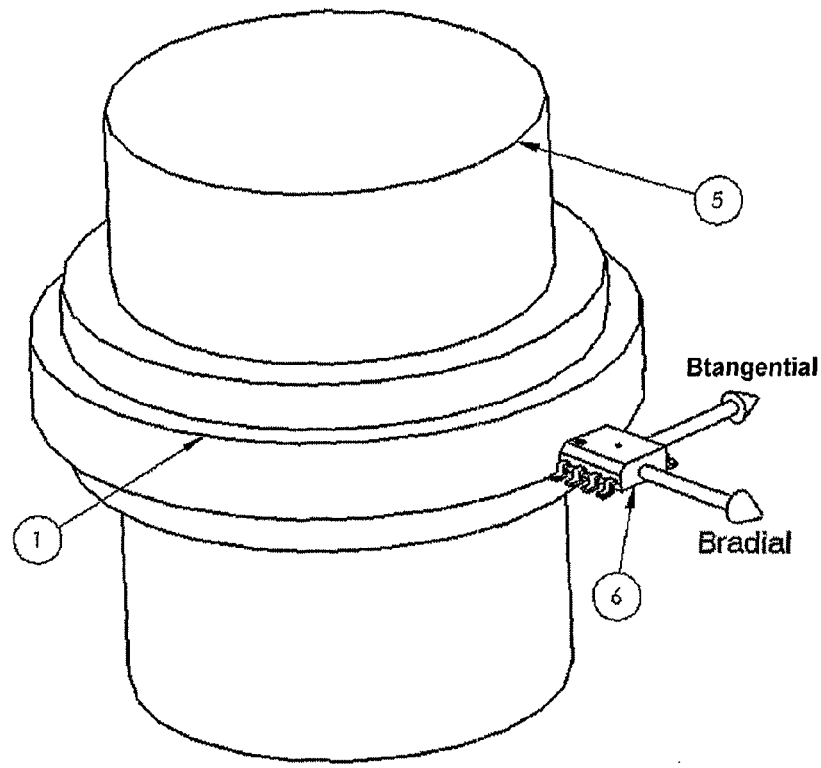
FIG. 5 shows a view of a rotary sensor using the radial and tangential components of the induction.
Figure 6:
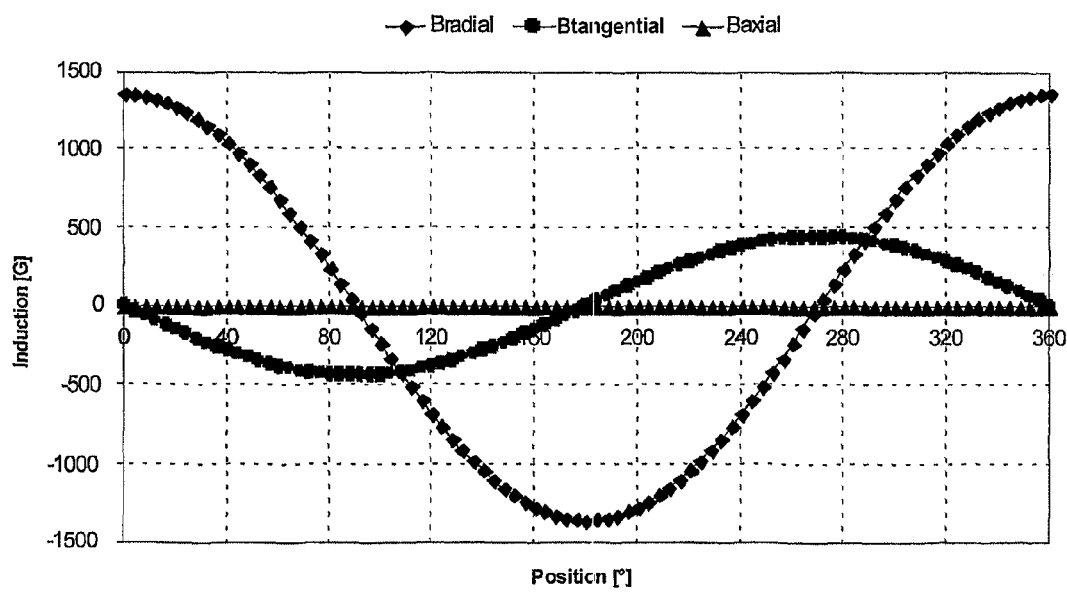
FIG. 6 shows the 3 magnetic induction components at any point in space for the configuration described in FIG. 5 (measurement point on the median plane of the magnet)

FIG. 5 shows the configuration of the sensor, for use as a steering column sensor, using the radial and tangential components of the magnetic field generated by the magnet (1). This configuration uses a diametrically magnetised ring magnet which is mounted directly on the axis of the steering column or of the drive shaft (5). The plane of the probe will advantageously be placed such a way that it is co-planar with the plane of symmetry of the magnet so as to limit the influence of the axial component of the magnetic field in the case of a positioning error of the probe (6). This is because, for this particular configuration, the axial component of the magnetic field is zero and therefore, even if the probe is not perfectly positioned, the projection of the axial component onto the tangential component measured by the probe will be zero. In this particular configuration, use is made of a probe which integrates the measurement of the two components of the field, the standardisation of the two components and the decoding of the angle on the basis of the two signals which are 90° out of phase. According to one preferred variant, the magnet will be directly adhesively bonded to the column.

Figure 7:
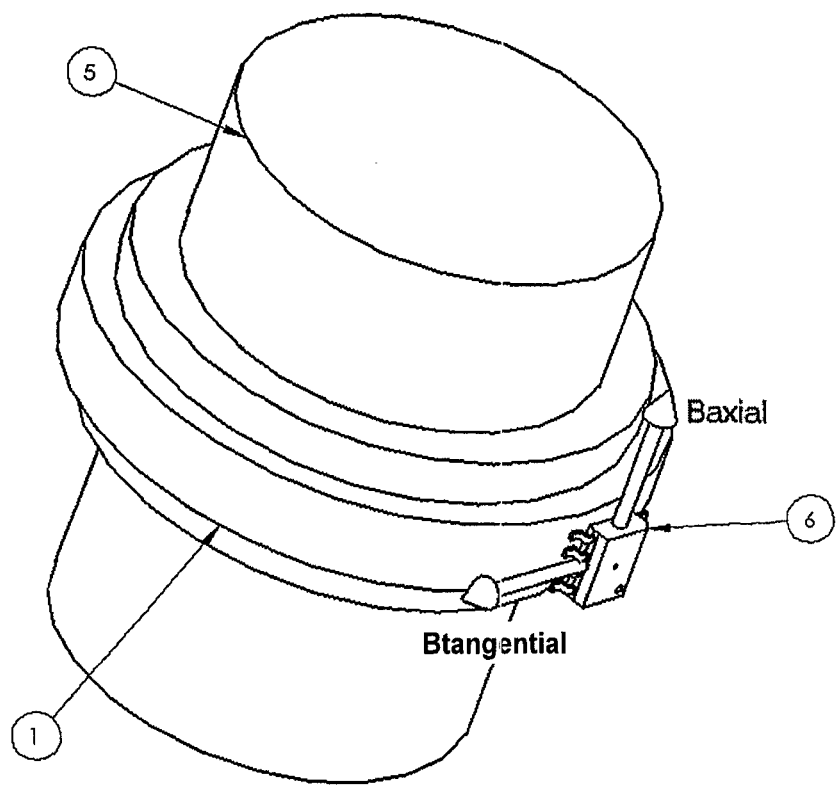
FIG. 7 shows a view of a rotary sensor using the axial and tangential components of the induction.

FIG. 7 shows a sensor configuration for use as a steering column sensor, using the axial and tangential components of the magnetic induction generated by the magnet (1). For this configuration, there is no position of the probe which leads to an obvious cancellation of the radial component which in the case of poor positioning of the probe (4) causes a contribution to the tangential component which may give rise to a distortion of the output signal. For such a configuration, the position of the probe will therefore advantageously be selected so as to reduce to a minimum the radial component while retaining an optimal amplitude on the two other components. In this particular configuration, use is made of a probe which integrates the measurement of the two components of the field, the standardisation of the two components and the decoding of the angle on the basis of the two signals which are 90° out of phase.

Figure 8:
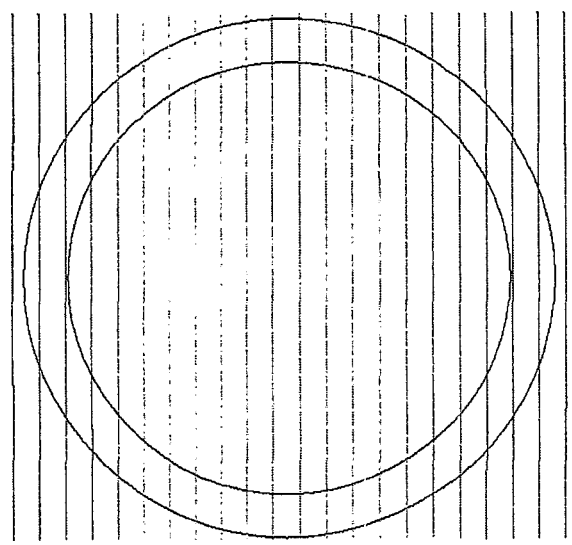
FIG. 8 shows the field lines inside the magnet upon magnetisation for a material with a relative permeability ($\mu r$) equal to 1.

FIG. 8 shows the field lines, upon magnetisation with a view to obtaining a diametrical magnetisation, inside and outside a ring magnet with a relative permeability equal to 1 ($\mu r=1$ such as that of air). The field lines pass through the magnet without undergoing any deformation, which allows a perfect diametrical magnetisation.

Figure 9:
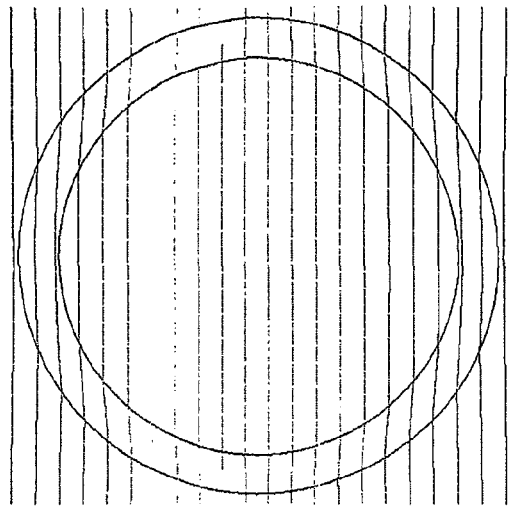
FIG. 9 shows the field lines inside the magnet upon magnetisation for a material with a relative permeability ($\mu r$) equal to 1.2.
Figure 10:
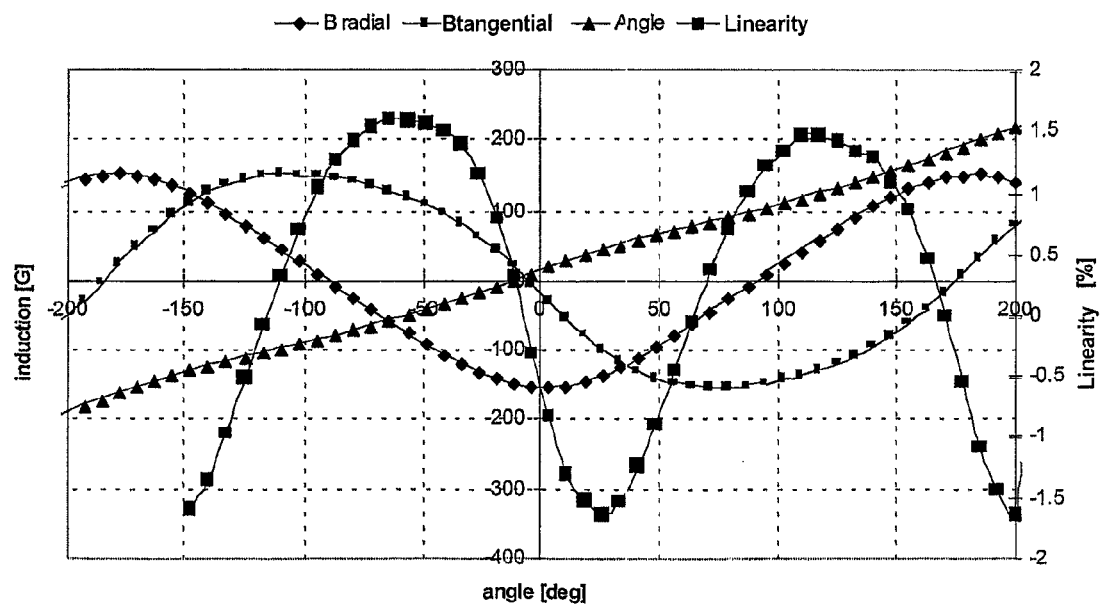
FIG. 10 shows the radial and tangential components of the magnetic induction and also the non-linearity of the signal measured on a "diametrically" magnetised isotropic circular ring magnet.
Figure 11:
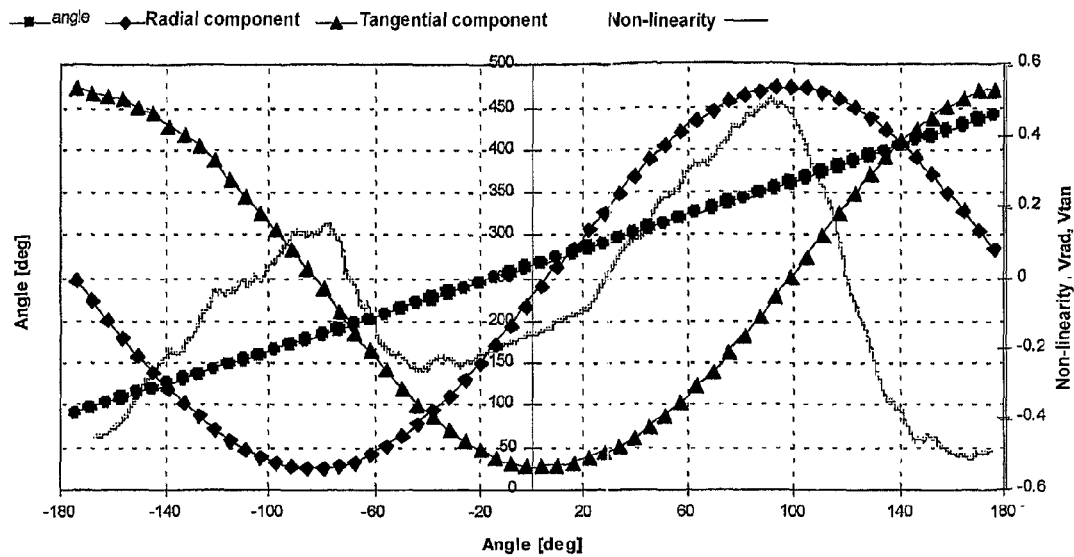
FIG. 11 shows the radial and tangential components of the magnetic induction and also the non-linearity of the signal measured on a "diametrically" magnetised isotropic magnet having an essentially elliptical external shape.

FIG. 9 shows the field lines, upon magnetisation, inside and outside a ring magnet with a relative permeability equal to 1.2. The field lines undergo a deformation as they pass through the magnet, said deformation being due to the difference in relative permeability between air ($\mu r=1$) and the magnet ($\mu r=1.2$ in the present case). This deviation of the field lines therefore translates into a poor diametrical magnetisation of the magnet. In order to solve this problem, it is of course possible to use an anisotropic magnet with a preferred magnetisation direction. In the case of an isotropic magnet, it will be difficult to obtain a good diametrical magnetisation, which will lead to the results shown in FIG. 10. In order to correct and compensate this magnetisation error, a magnet having an essentially elliptical external shape may be used. The components of the induction which are measured or such a magnet are shown in FIG. 11. A marked improvement can be seen in the non-linearity caused by the difference in refraction of the field lines and also the change in the measurement gap.

Figure 12:
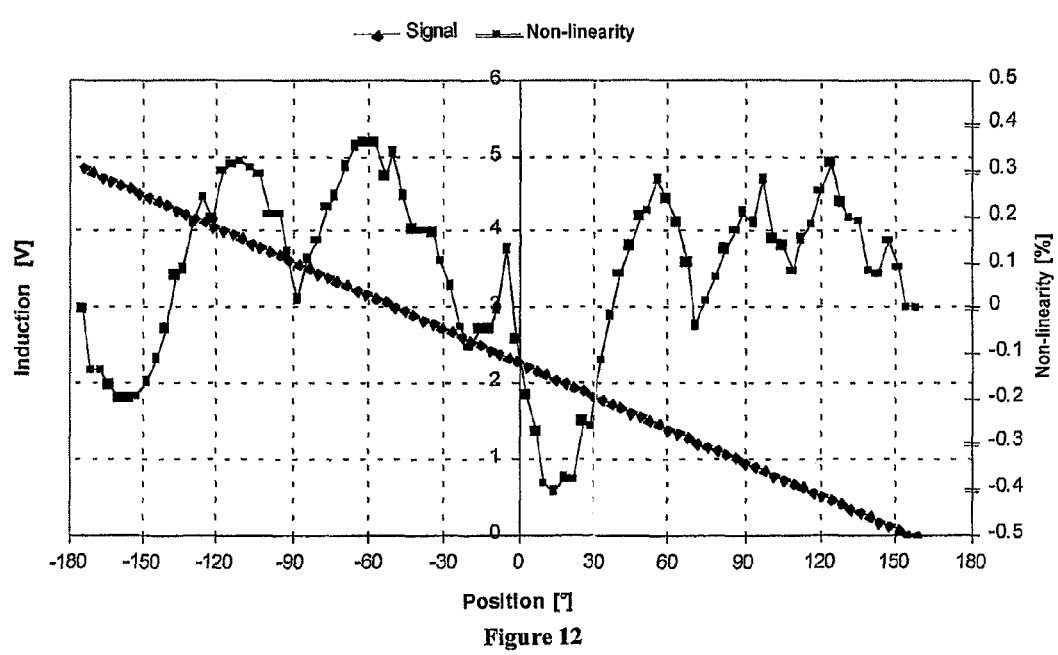
FIG. 12 shows the signal obtained on an isotropic magnet and decoded with a non-linear transfer function.

In the case of an isotropic ring magnet which is magnetised with a poor diametrical magnetisation due to the refraction of the field lines at the surface of the magnet during the magnetisation process, it is possible when using a programmable probe to program a non-linear transfer function which makes it possible to partially compensate the non-linearity of the signal (see FIG. 12).

Figure 13:
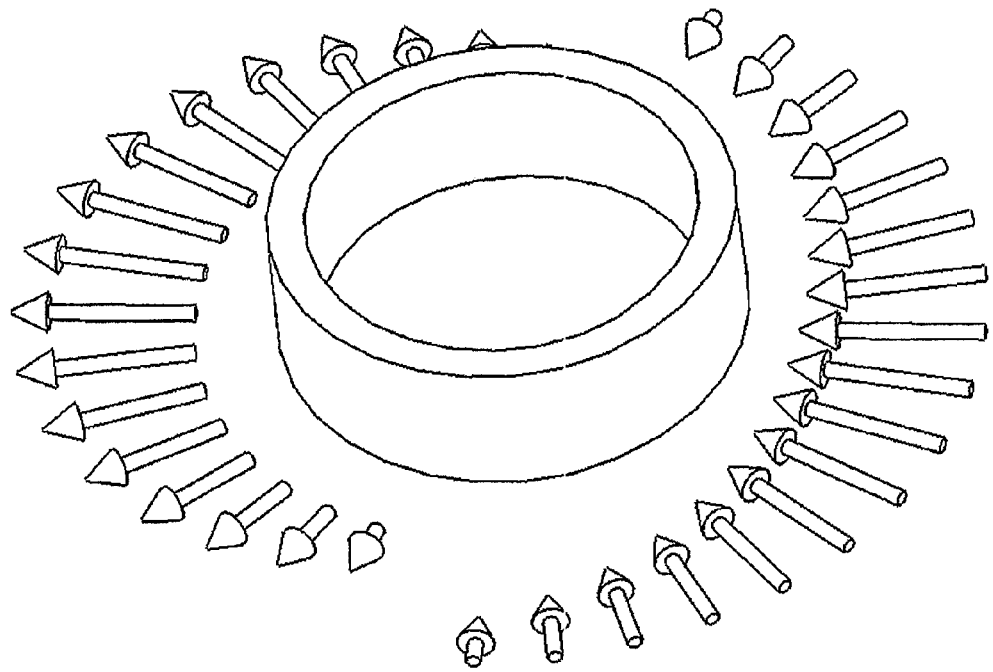
FIG. 13 shows a magnet with progressive radial magnetisation.
Figure 14:
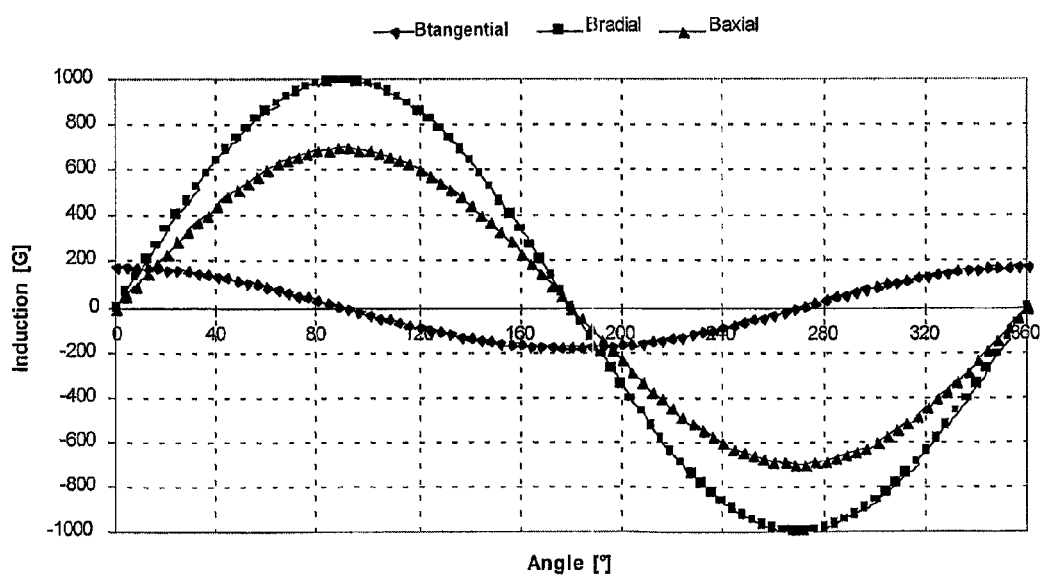
FIG. 14 shows the 3 components of the magnetic induction at any point in space around the magnet.

In the case of an isotropic magnet or a magnet having radial anisotropy, FIG. 13 shows a ring magnet with a sinusoidal variation of the remnant magnetisation over 1 revolution. Such a configuration leads to the signals shown in FIG. 14.

Figure 15:
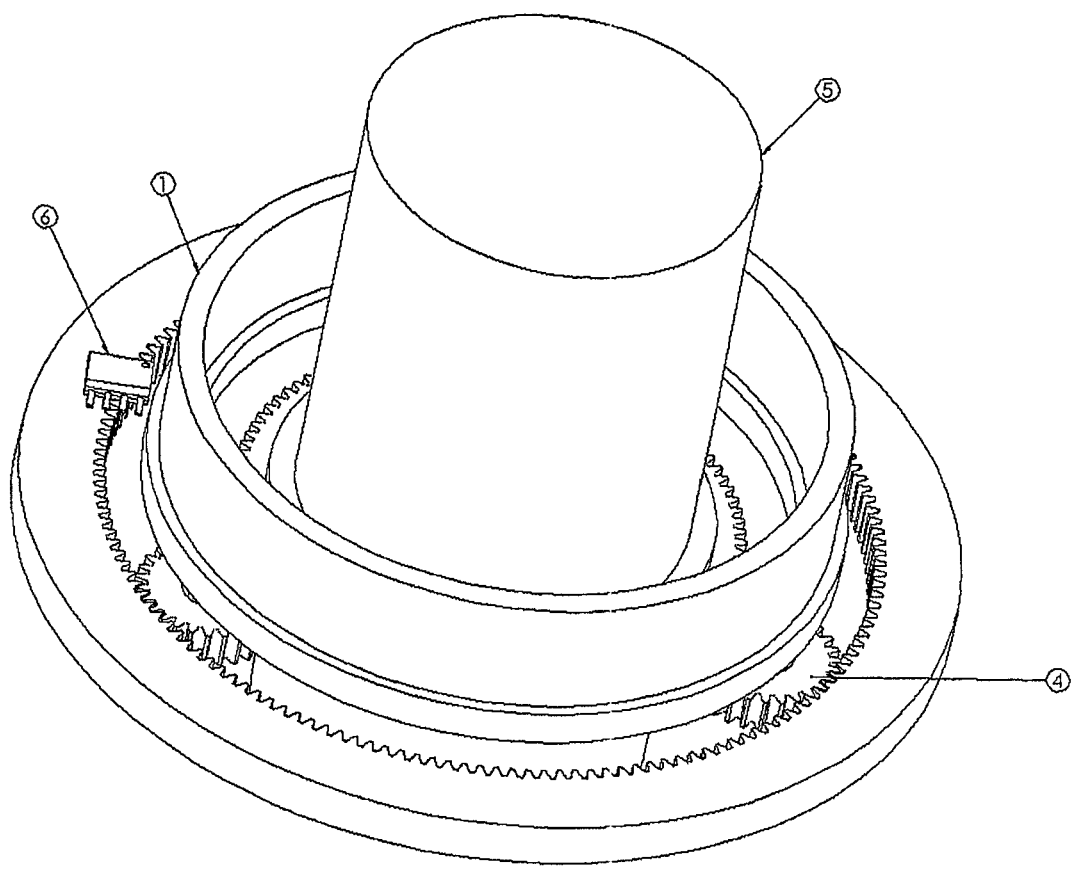
FIG. 15 shows the integration of the sensor according to the present invention integrated with a reducer so as to be used for a multiple-revolution application.

FIG. 15 shows the sensor according to the present invention integrated with a ring magnet integrated with the output of a reducer so as to measure a course greater than 360° of an element located at the input of the reducer. This may be used for example in the case of a steering column which requires detection of the angular position of the steering wheel over several revolutions. The example of FIG. 15 shows the sensor associated with a planetary reducer, but any other reducing system can be used provided that the integration is compatible with the application.

Figure 16:
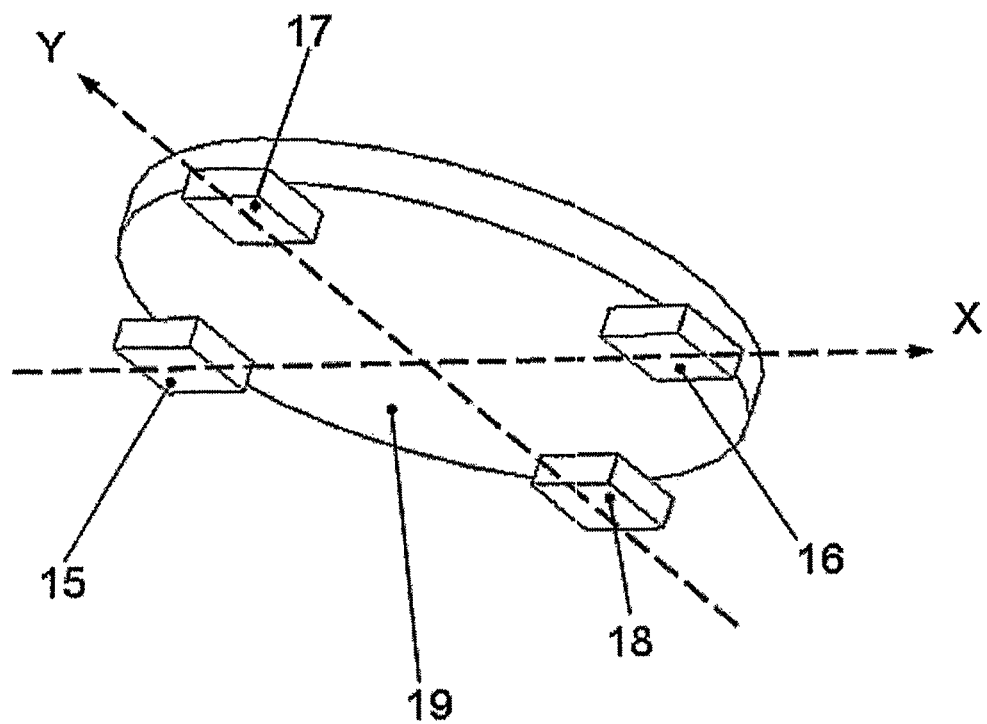
FIG. 16 shows the four Hall elements placed on the edge of a magnetic flux concentrator.

FIG. 16 shows the flux concentrator (19) and the four Hall elements (15, 16, 17 and 18) placed below the edge of the element 19 and spaced apart by 90°. Each of the Hall elements (15, 16, 17 and 18) has a detection axis oriented along the axis Z perpendicular to the plane XOY of the flux concentrator (19). The elements 15 and 16 measure the magnetic induction along the axis X and the elements 17 and 18 measure the magnetic induction along the axis Y. The four elements (15, 16, 17 and 18) and the yoke (19) of the flux concentrator (19) are mounted in a housing which encapsulates the assembly so as to form a single component.

Figure 17:
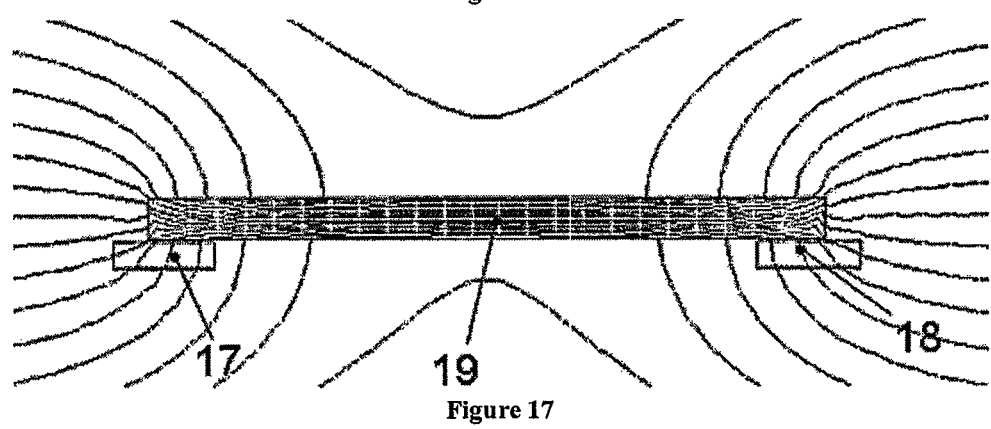
FIG. 17 shows the magnetic field lines in the presence of the flux concentrator.

FIG. 17 shows the magnetic field lines in the presence of a magnetic flux concentrator (19), in a vertical section along one of the axes X and Y. The field lines bend and become perpendicular to the surface of the concentrator, passing through the Hall elements (17) and (18).

Figure 18:
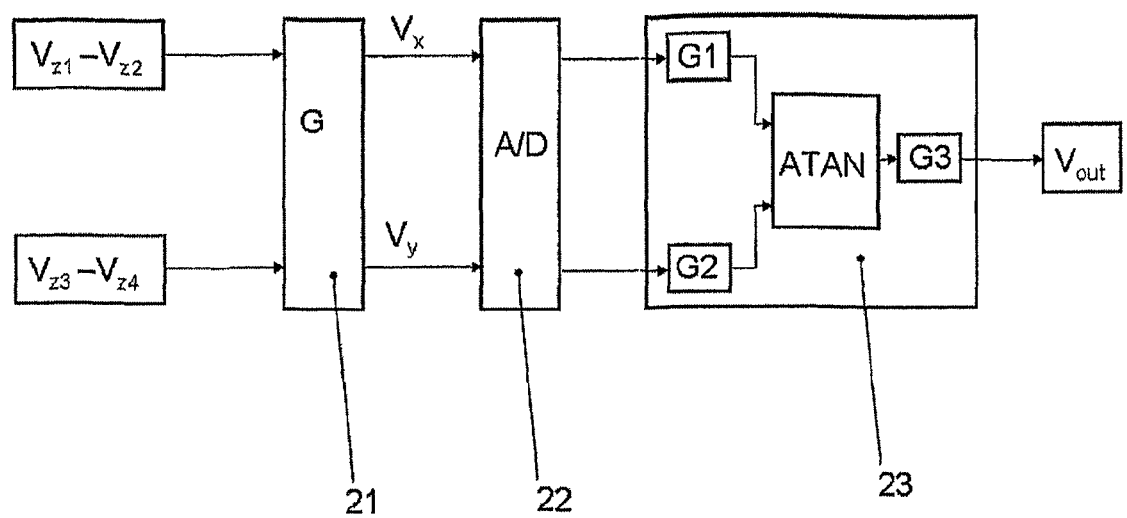
FIG. 18 shows a block diagram of the signal processing of a probe using four Hall elements and a magnetic flux concentrator.

FIG. 18 shows a block diagram of the signal processing. The signals $V_x$ and $V_y$ are obtained from the Hall elements 15 (which delivers the signal $V_{z1}$), 16 (which delivers the signal $V_{z2}$) and 17 (which delivers the signal $V_{z3}$), 18 (which delivers the signal $V_{z4}$). The differences are amplified by the gain (21) (including the electronic gain and the gain due to the ferromagnetic concentrator 19), they pass through the analogue/digital converter (22) and they arrive at the digital signal processing block (23): the correction of the measured amplitudes is carried out by this block, which delivers the output signal ($V_{out}$).

Figure 19:
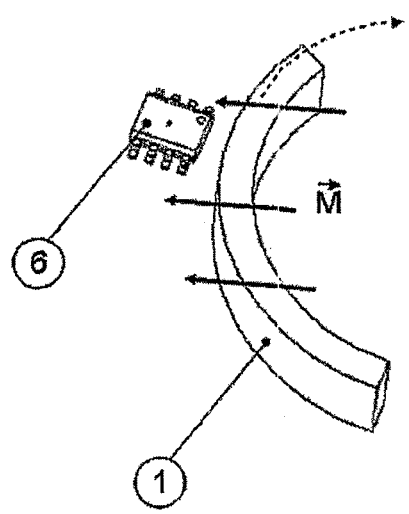
FIGS. 19 and 20 show a secondary embodiment according to the invention, in which the magnet is a tile.
Figure 20:
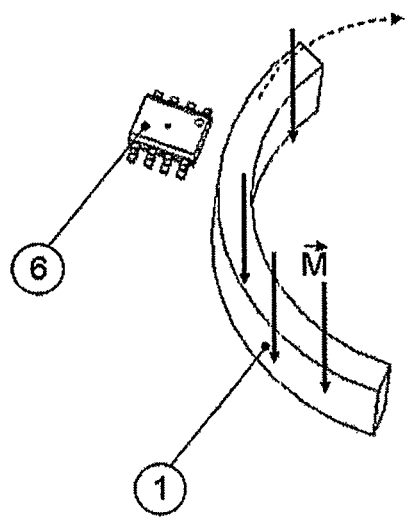

In FIGS. 19 and 20, the magnet (1) is a cylindrical tile which has a diametrical magnetisation. This diametrical orientation can describe an infinite number of directions relative to the tile (1). FIGS. 19 and 20 are two examples of directions which this magnetisation may assume. In FIG. 19, the magnetisation is radial to the centre of the magnet (1), whereas it is tangential in FIG. 20. These examples are therefore not in any way limiting in nature.

Figure 21:
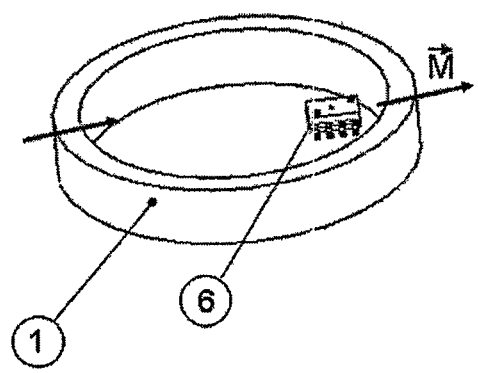
FIG. 21 shows a secondary embodiment according to the invention, in which the probe comprising the magnetosensitive elements is located inside the hollow cylindrical magnet.

FIG. 21 shows a secondary embodiment in which the probe (6) is located inside the cylindrical and hollow magnet (1) forming a ring. It may in fact be beneficial to allow the probe (6) to be placed in this way if the dimensions of the system receiving the sensor require it.

Figure 22:
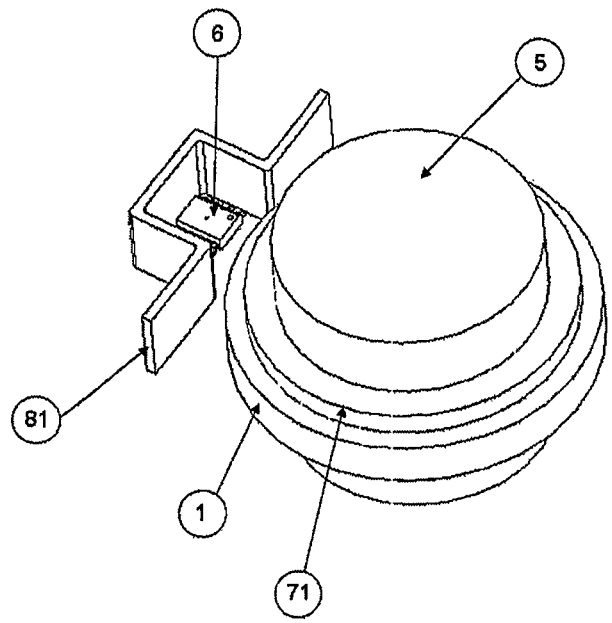
FIGS. 22, 23 and 26 show secondary embodiments according to the invention, in which the probe is associated with a shield for shielding against external magnetic fields.
Figure 23:
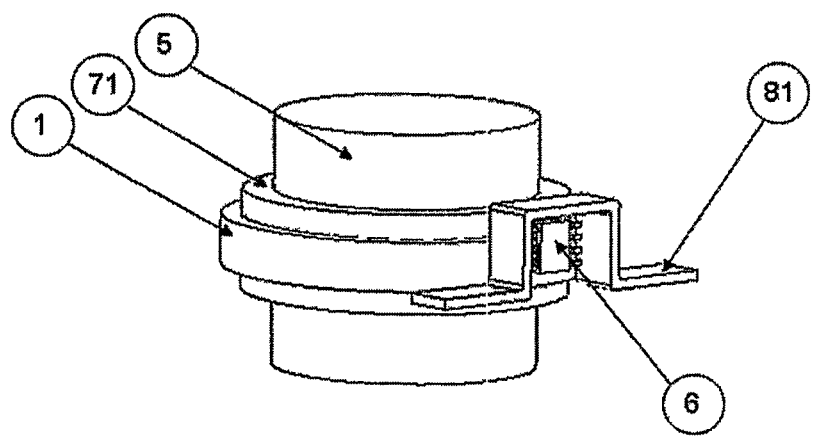

FIGS. 22 and 23 show the sensor described by the invention associated with a shield (81) for shielding against external magnetic fields. It may in fact be beneficial to ensure an insensitivity to external fields if the sensor is intended to be used in a polluted environment. In FIG. 22, the magnet (1) is mounted on a ferromagnetic yoke (71) which is itself mounted on a shaft 5. The probe (6) is placed in front of the magnet (1) oriented so as to measure the tangential and radial components of the magnetic field. It is surrounded by a shield (81) made of a material which is commonly used for this type of function, such as alloys with a high magnetic permeability by way of non-limiting example. Since the probe (6) is insensitive to axial magnetic fields, the shield (81) will preferably be placed around the probe (6) in the plane of the magnet. In FIG. 23, the same shielding function associated with the same sensor is found, but here the probe (6) is placed in such a way as to measure the tangential and axial components of the magnetic field. In this embodiment, and since the probe (6) is insensitive to radial magnetic fields, the shield (81) will preferably be placed around the probe in the plane tangential to the magnet (11). Placed in this way, the shield (81) makes it possible to ensure an insensitivity to external magnetic fields during the measurement. In FIGS. 22 and 23, this shield (81) is in the form of a folded thin plate of small dimensions.

This shield (81) shown in FIGS. 22 and 23 is an advantageous solution which allows a minimum size, but is in no way limiting. All the shielding means known to the person skilled in the art can of course be integrated with the position sensor.

Figure 26:
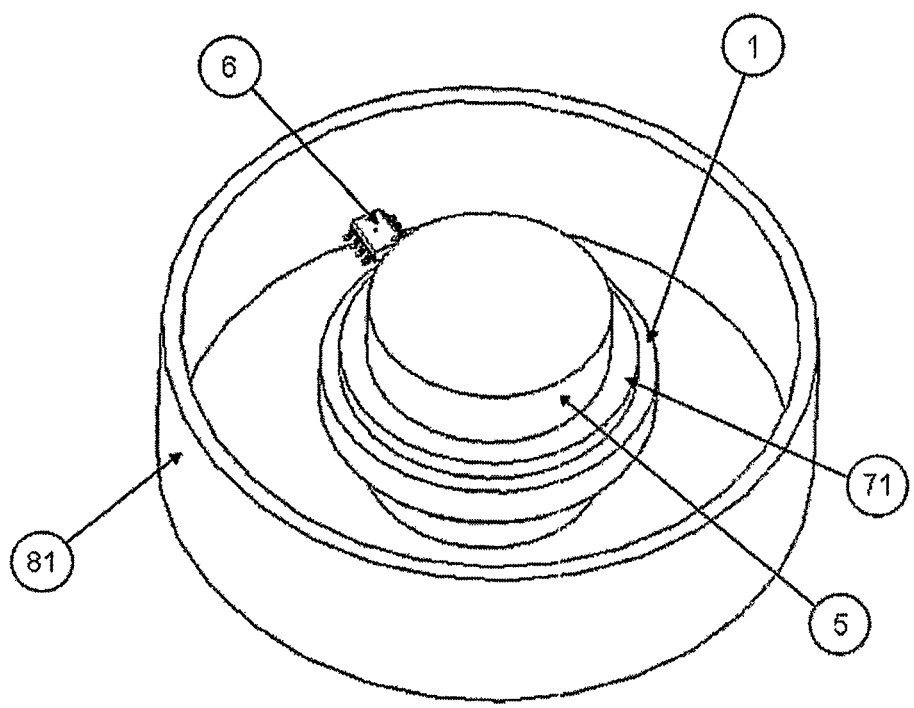

For instance, in FIG. 26, the shield (81) is represented by a ring which completely surrounds the assembly consisting of the magnet (1)+probe (6).

Figure 24:
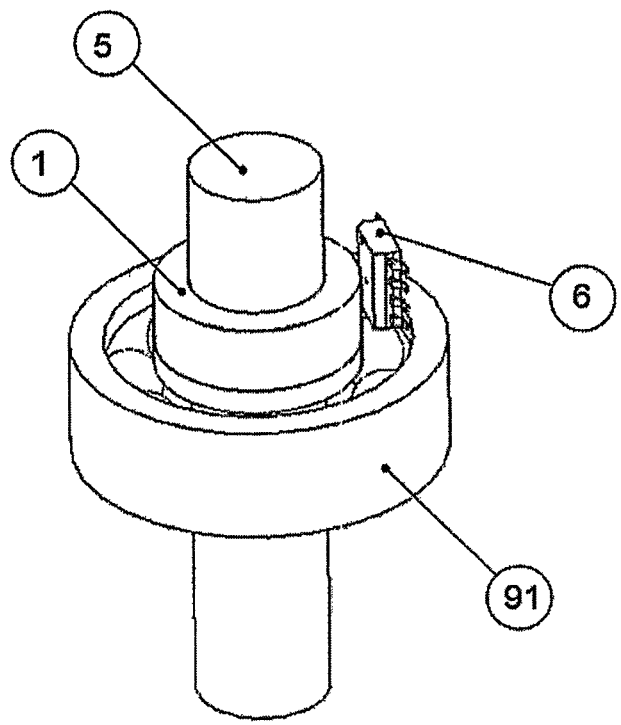
FIGS. 24 and 25 show a secondary embodiment according to the invention, in which the sensor is associated with a bearing.
Figure 25:
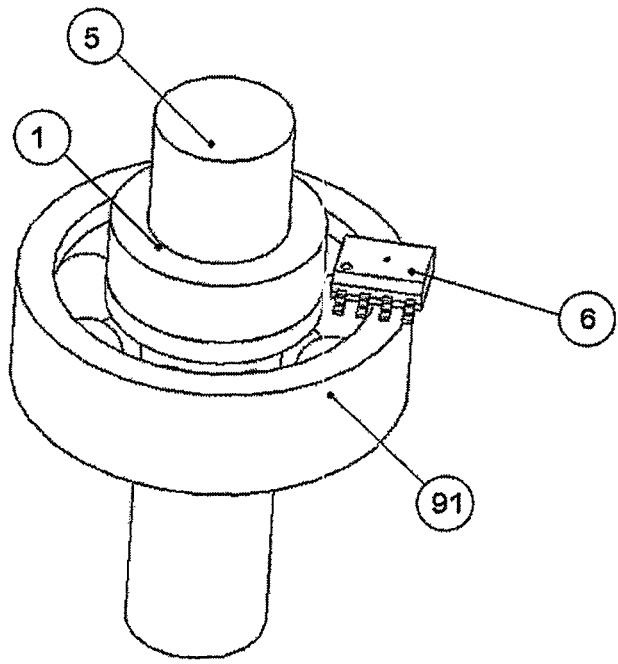

Since the sensor according to the invention is particularly suitable, in a non-limiting manner, for applications comprising a through-shaft, it may be envisaged to place the sensor in the direct vicinity of a bearing, for example a ball bearing. FIGS. 24 and 25 show two embodiments of the sensor described by the invention associated with a ball bearing (91). The probe (6) of FIG. 24 is sensitive to tangential and axial fields, whereas the probe (6) in FIG. 25 is sensitive to tangential and radial fields. In both cases, the ball bearing (91) is placed in the vicinity of the sensor so as to form a compact assembly. Ideally, the magnet (1) and the dimensions of the sensor, and also the position of the sensitive elements, should be selected as a function of the dimensions of the bearing (91) and the total size of the assembly consisting of the sensor and the bearing (91).

The invention claimed is:

1. An angular position sensor comprising:
   a moving element consisting of at least one essentially cylindrical permanent magnet turning about an axis, said magnet made of an isotropic material;
   at least two magnetosensitive elements, said magnetosensitive elements located approximately at a same point, said magnetosensitive elements measure a tangential component of magnetic field and a radial component or axial component of the magnetic field;
   at least one processing circuit delivering a signal function of the absolute position of the moving element; and
   means for compensating for curvature of field lines inside the magnet.

2. The angular position sensor according to claim 1, wherein said means for compensating for the curvature of field lines is formed by a processing circuit for adjusting a programmable gain over an entire stroke of the sensor.

3. The angular position sensor according to claim 1, wherein said means for compensating for the curvature of field lines includes a processing circuit for adjusting the sensor to compensate for nonlinearity error in a programmable gain in the sensor.

4. The angular position sensor according to claim 1, wherein said magnet has an elliptical shape.

5. The angular position sensor according to claim 1, wherein said magnet has a sinusoidal magnetization on a periphery of the magnet.

6. The angular position sensor according to claim 1, further comprising:
   a plurality of additional magnetosensitive elements measuring a concentration of magnetic flux and magnetism along two pairs of parallel axes, said additional magnetosensitive elements being placed near the periphery of a cylinder perpendicular to the two pairs of parallel axes, two of said at least two magnetosensitive elements and additional magnetosensitive elements measuring the radial component or axial magnetic field and two of said at least two magnetosensitive elements and additional magnetosensitive elements measuring the tangential component of the magnetic field.

7. The angular position sensor according to claim 6, wherein the at least one processing circuit makes an arctangent calculation using two electrical signals from at least two of the plurality of additional magnetosensitive elements.

8. The angular position sensor according to claim 6, wherein the at least one processing circuit adjusts a programmable gain of two electrical signals from at least two of the plurality of additional magnetosensitive elements.

9. The angular position sensor according to claim 1, wherein the at least two magnetosensitive elements and the processing circuit are integrated in a single housing.

10. The angular position sensor according to claim 1, wherein the permanent magnet is a hollow cylinder.

11. The angular position sensor according to claim 6, wherein the plurality of additional magnetosensitive elements are located approximately in a plane of the magnet.

12. The angular position sensor according to claim 1, wherein the moving element includes the magnet mounted on a rotating shaft whose position is to be measured.

13. The angular position sensor according to claim 1, wherein the magnet is bonded to a ferromagnetic yoke.

14. The angular position sensor according to claim 1, wherein the magnet is a substantially diametrically magnetized magnet.

15. The angular position sensor according to claim 1, wherein the magnet is a magnet tile that is substantially diametrically magnetized.

16. The angular position sensor according to claim 1, wherein the magnet has a progressive sinusoidal magnetization over one revolution.

17. The angular position sensor according to claim 1, wherein the at least one processing circuit performs a non-linear programming of a transfer function.

18. The angular position sensor according to claim 1, wherein the at least two magnetosensitive elements measure radial and tangential components of magnetic induction generated by the magnet.

19. The angular position sensor according to claim 1, wherein the sensor measures an angular position of the moving element less than or equal to 360°.

20. The angular position sensor according to claim 1, wherein the magnet is fixed to a gearbox output.

* * * * *